(12) United States Patent
Hansen

(10) Patent No.: US 7,489,592 B2
(45) Date of Patent: Feb. 10, 2009

(54) PATCH TEST FOR 3D SONAR DATA

(75) Inventor: Rolf Hansen, Bergen (NO)

(73) Assignee: Coda Octopus Group Inc, NY, NY (US)

(*) Notice: Subject to any disclaimer, the term of this patent is extended or adjusted under 35 U.S.C. 154(b) by 14 days.

(21) Appl. No.: 11/676,427

(22) Filed: Feb. 19, 2007

(65) Prior Publication Data

US 2008/0198694 A1    Aug. 21, 2008

(51) Int. Cl.
*G01S 15/00* (2006.01)
(52) U.S. Cl. .......................... 367/96; 367/12
(58) Field of Classification Search ............. 367/7, 367/12, 13, 88, 96, 97, 901
See application file for complete search history.

(56) References Cited

U.S. PATENT DOCUMENTS

| | | | | | |
|---|---|---|---|---|---|
| 4,611,313 | A | * | 9/1986 | Ziese | 367/88 |
| 5,640,369 | A | * | 6/1997 | Capell, Sr. | 367/88 |
| 2008/0198694 | A1 | * | 8/2008 | Hansen | 367/96 |

OTHER PUBLICATIONS

Gueriot, et al., "The Patch Test: A Comprehensive Calibration Tool for Multibeam Echosounders," Oceans 2000 MTS/IEEE Conference and Exhibition, vol. 3, Sep. 11-14, 2000, pp. 1655-1661.*

* cited by examiner

*Primary Examiner*—Dan Pihulic
(74) *Attorney, Agent, or Firm*—Rodney T Hodgson

(57) ABSTRACT

A method of automatically performing a patch test for a sonar system is disclosed, where data from a plurality of overlapping 3D sonar scans of a surface as the platform is moved are used to compensate for biases in mounting the sonar system on the platform.

12 Claims, No Drawings

PATCH TEST FOR 3D SONAR DATA

FIELD OF THE INVENTION

The field of the invention is the field of automatic calibration of three dimensional sonar imaging equipment.

RELATED PATENTS AND APPLICATIONS

U.S. Pat. No. 6,438,071, issued to Hansen, et al. on Aug. 20, 2002, and entitled "Method for producing a 3D image" and U.S. Patent application Ser. No. 11/504826 filed Aug. 15, 2006 by Hansen entitled "Method of constructing mathematical representations of objects from reflected sonar signals" are assigned to the assignee of the present invention and is incorporated herein by reference in their entirety including incorporated material.

OBJECTS OF THE INVENTION

It is an object of the invention to produce an automatic method of measuring and correcting for bias in a three dimensional sonar imaging device.

SUMMARY OF THE INVENTION

A three dimensional sonar imaging device is mounted on a device carrier or platform. Errors in mounting the device are automatically discovered and automatically compensated for by software as the device moves relative to a sonar reflecting surface. If sufficient information is not received to calculate compensation, the system automatically notifies the operator of the device carrier or the computer controlling an autonomous device carrier to move the device in an appropriate pattern to produce the necessary information.

DETAILED DESCRIPTION OF THE INVENTION

Three dimensional sonar imaging systems use devices which are carried on device carriers or platforms such as ships, on lines attached to rigidly or loosely to ships, or on other mobile vehicles which may be tethered to a ship by a line which communicates power and information, or on free moving autonomous vehicles which operate under control of a computer system. Such systems monitor motions using sensors that translates the local sensor coordinates to the global coordinates based on bathymetric sonar.

When the device is attached to the device carrier, it is difficult to mount the device accurately with respect to device carrier axis. For example, mounting the device on a ship to within a degree or two of horizontal is very difficult, and lining the device up with the directional heading of the ship in motion is worse.

Without compensation, the device receiving sonar reflections from a flat, horizontal sea bottom, for example, would show the sea bottom with a few degrees of tilt. In U.S. patent application Ser. No. 11/504826, the data are fit to a plane and the slope of the seabed is returned. Moving the device carrier on to a different heading will show that the slope changes, which is impossible.

Two such images can be statistically combined to give an offset or bias measurement of the roll and pitch of the installed device with respect to the device carrier. More complicated fitting of various images together will give higher order corrections to make the images converge. Such mounting biases must be detected and compensated for in a procedure called a "patch test"

Manually carrying out such patch tests is very time consuming and prone to operator error, as the various biases are coupled and difficult to compensate for one at a time. The method of the invention uses a computer to compute the biases by analyzing a series of images produced as the device is moved, and mathematically computing the biases to minimize a bias factor. When the motion of the device does not provide enough images to calculate and correct for the biases, the system automatically directs the operator or controller of the device carrier to move in such a fashion that the correct images are efficiently received. The biases measured are automatically entered into the system, and used to recalculate the biases until the system converges upon biases that are of the same order as the system noise.

This invention disclosure describes the use of 3D sonar data where a sonar or several sonars or echo-sounders collect simultaneous 3 sonar data. In order to use the 3D method one must be able to match two overlapping 3D data sets. This can be done by for example by the Iterative Closest Point (ICP) algorithm (presented in the patents and patent applications noted above and in references given therein) or by fitting regression planes to the data. The regression plane method will generally not provide data that can be used for estimation of linear offsets while the ICP will be useful for estimation of all offsets (linear and rotational).

Note that we can use one sensor providing 3D data—a 3D sonar—or we can use multiple 2D sonars or echo sounders that together forms a 3D data set. If the environment is static, the 3D data set can be acquired over time. If the environment varies with time, the 3D data set must be acquired in a short time over which the data set can be assumed to be static—static in the sense that errors due to time variation are negligible. This 3D data set that may come from multiple discrete sensors is called the "sensor data set" in the following. They all refer to the same local frame of reference.

Define vectors as follows:

$\vec{p}_v$: Vehicle coordinate vector $\vec{p}_w$: World coordinate vector $\vec{p}_s$: Sensor coordinate vector S: Motion matrix—maps from sensor frame to vehicle frame. This is the offset matrix.

V: Motion matrix—maps from vehicle frame to world frame $P_s$: Sensor coordinate matrix $P_v$: Vehicle coordinate matrix $P_w$: World coordinate matrix We have $$P_s = \{\vec{p}_s\}$$

and correspondingly for the vehicle and world systems. $P_s$ is (4×N) where N is the number of points.

For a given data set, the vehicle coordinates are given by:

$$P_v = S P_s \qquad (1)$$

and the world coordinates are given by:

$$P_w = V P_v = V S P_s \qquad (2)$$

Assume two data sets—data set 1 global frame of reference and data set 2 global frame of reference. The two data sets cover the same area so that $$P_{w2,1} = W P_{w1} \qquad (3)$$

where $P_{w1}$ is data set 1 expressed in data set 1 global frame of reference and $P_{w2,1}$ is data set 1 expressed in data set 2 global frame of reference.

Likewise $$P_{w1,2} = W^{-1} P_{w2} \tag{4}$$

where $P_{w2}$ is data set 2 expressed in data set 2 global frame of reference and $P_{w1,2}$ is data set 2 expressed in data set 1 global frame of reference.

W is thus mapping the data from one frame of reference to the other and vice versa.

Assume that the two data sets represent different geometries, so that the problem has a solution other than the trivial. Also assume the the alignment is not perfect, thus $$W \neq I$$

Where I is the identity matrix.

W can be found in a number of ways:

By using Fast ICP noted in the above referenced patents and patent applications.

By using methods shown in the following references

P.Besl and N.McKay. A method for registration of 3-D shapes. IEEE Transactions on Pattern Analysis and Machine Intelligence. 14/2):239-256. February 1992

S.Rusinkiewicz, O. Hall-Holt and M. Levoy. Realtime 3d model acquisition. In Proceedings of Siggraph (SIGGRAPH 2002), pages 438-446, 2002.

By using multiple regression analysis noted in the above referenced patents and patent applications Let us assume that W has been found.

We want to minimize $$E = P_{w2,1} - P_{w1} \tag{5}$$

as we should get the same coordinates from the two different frames of reference if all the coordinate transformations were correct—i.e. the offset matrix S is correct.

Let us assume that the coordinate transformations are not correct, that V is known with high accuracy (i.e. we obtain position, pitch, roll and heading with high accuracy) and that S contains errors (i.e. pitch, roll, yaw and position offset errors).

Combining (2), (3) and (5) yields $$E = (W-1) V_1 S P_{S1} \tag{6}$$

Where index 1 denotes data set number 1. Note that V varies from data set to data set while S is constant. This means that we assume that the sensor is fixed with respect to the vehicle.

Let $$A = (W-1) V_1 S \tag{7}$$

In order to minimise E, we need to minimise A. To minimise A means to maximise $A^{-1}$.

A may not be invertible, but its pseudoinverse $A^+$ can be written $$A^+ = (AA^H)^+ A^H \tag{8}$$

Using the spectral theorem, we can write $$AA^H = \sum_i \lambda_i \vec{q}_i \vec{q}_i^H \tag{9}$$

As $AA^H$ is Hermitian, its eigenvectors $\vec{q}_i$ are orthonormal.

If the relationship between data sets 1 and 2 is such that one eigenvectors $\vec{q}_n$ dominates—it's eigenvalue is larger then the others $$\lambda_\alpha = \max\{\lambda_i\}, \tag{10}$$

then we need to correct that dominant degree of freedom, correct S correspondingly and continue the iterations until $W \approx I$. The criterion will simply be the sum of eigenvalues:

$$\sigma = \sum_i \lambda_i < k \tag{11}$$

Where the limit k has to be according to the quality of V. If (11) is computed for every iteration, one will continue to iterate as long as the sum of eigenvalues decreases. When it converges, we have reached the noise level of the system.

In each step of the iteration, correct each position with $$\vec{d} = \frac{1}{2} \sqrt{\lambda_\alpha} \, \vec{q}_\alpha \tag{12}$$

where $\lambda_\alpha$ is defined by (10) and $\vec{q}_\alpha$ is the corresponding eigenvector.

Using (2), this yields for data set 1:

$$V_{1S_d \vec{p}_{s1i}} = \vec{d} \tag{13}$$

and for data set 2:

$$V_{2S_d \vec{p}_{s2i}} = \vec{d} \tag{14}$$

where indexes 1 and 2 represent data sets 1 and 2 respectively, $S_d$ is the correction of S and $\vec{p}_{s1i}$ and $\vec{p}_{s2i}$ denote all the sensor coordinate vectors.

From (13) and (14) respectively, we get $$S_d = V_1^{-1} \vec{d} \, \vec{p}_{s1i}^H (\vec{p}_{s1i} \vec{p}_{s1i}^H)^+ \tag{15}$$

and $$S_d = V_2^{-1} \vec{d} \, \vec{p}_{s2i}^H (\vec{p}_{s2i} \vec{p}_{s2i}^H)^+ \tag{16}$$

If data set 1 includes N sensor coordinate vectors and data set 2 includes M sensor coordinate vectors, there are (M+N) equations that define the 12 entries in the motion difference matrix $S_d$.

This can also be written $$S_d = V_1^{-1} \{\vec{d}\} P_{s1}^H (P_{s1} P_{s1}^H)^+ \tag{17}$$

and $$S_d = V_2^{-1} \{\vec{d}\} P_{s2}^H (P_{s2} P_{s2}^H)^+ \tag{18}$$

respectively. Here, $\{\vec{d}\}$ is the 4 by N or M matrix that is formed when we use $\vec{d}$ as column vector N or M times respectively.

Use of the pseudoinverse of $(P P^H)$ means that this represents the least square solution.

The offset matrix S is found automatically as the device carrier is moving and producing overlapping images by the following algorithm.

Based on overlapping data from two images, find A from (7)

Compute $AA^H$.

Find the eigensets of $AA^H$

Find σ from (11).

Compare σ with the results from previous iterations and see if it has converged.

Find $\lambda_n = \max\{\lambda_i\}$ and compared to σ. If this ratio is above a factor (for example 0.9), set the correction vector $$\vec{d} = \frac{1}{2}\sqrt{\lambda_n}\,\vec{q}_n.$$

Compute $S_d$ from (17) and (18), ignoring the noise terms in the spectral decomposition of $(P_{s2}P_{s2}^H)^+$.

Compute the corrected offset matrix:

$$S_c = S - S_d$$

Continue with item 1) again.

With a 3D sonar this process can be automated and overlapping data sets will provide large data sets with high reliability.

If there is insufficient data, the system automatically notifies the operator to move the device carrier to a location where sufficient data may be taken.

In general the device carrier must carry the device over the same area several times and the area should have features so that errors in position of an object will be revealed. If the sea bed is completely flat, pitch and roll errors will be detected, but there is no information in the sea bed data that allows for detection of heading or linear offset errors. The automatic method described above will show this as the eigensets corresponding to these parameters will never dominate. Hence the method will provide input to how the vehicle should move in order to obtain a full set of parameters at a given accuracy.

For a device carrier operated by an operator, the system sends a signal to proceed to a location where there is a sea bed feature and when such features are detected, the system directs the operator to traverse several paths over the feature on a different heading. The new set of images can then be automatically registered to give the heading and linear offset errors.

In an autonomous vehicle the computer directing the vehicle is instructed to do the same thing.

Obviously, many modifications and variations of the present invention are possible in light of the above teachings. It is therefore to be understood that, within the scope of the appended claims, the invention may be practiced otherwise than as specifically described.

I claim:

1. A method of performing a patch test for a sonar system, comprising:
   a) mounting a device comprising a system of a plurality of detectors of reflected sonar signals on a device carrier;
   b) automatically directing a plurality of sonar beam pulses towards a sonar reflecting surface as the device carrier moves relative to the sonar reflecting surface;
   c) automatically detecting sonar signals reflected from the sonar reflecting surface with the system of the plurality of detectors; and
   d) automatically computing a bias compensation for the device.

2. The method of claim 1, further comprising;
   e) setting the bias compensation for the device; and
   f) repeating steps b)-e) until changes of bias compensation for each set of repeated steps equals the noise level of the system.

3. The method of claim 1, further comprising;
   e) automatically generating instructions to an operator of the device carrier to move the device carrier in a particular pattern.

4. The method of claim 1, further comprising;
   e) automatically generating instructions instructing a controller of the device carrier to move the device carrier in a particular pattern, wherein the device carrier is an autonomous device carrier.

5. A method of performing a patch test for a sonar system, comprising:
   a) mounting a device comprising a system of a plurality of detectors of reflected sonar signals on a device carrier;
   b) automatically directing a plurality of sonar beam pulses towards a sonar reflecting surface as the device carrier moves relative to the sonar reflecting surface;
   c) automatically detecting sonar signals reflected from the sonar reflecting surface with the system of the plurality of detectors; and
   d) automatically computing a bias compensation for the device, wherein the step of automatically computing includes a step of automatically specifying the track of the device carrier.

6. A method of performing a patch test for a sonar system, comprising:
   a) mounting a three dimensional imaging device comprising a system of a plurality of detectors of reflected sonar signals on a device carrier;
   b) automatically directing a first sonar beam pulse towards a sonar reflecting surface as the device carrier moves relative to the sonar reflecting surface;
   c) automatically detecting sonar signals reflected from the first sonar reflecting surface with the system of the plurality of detectors;
   d) automatically analyzing the reflected sonar signals from the first pulse to produce a first three dimensional representation of the sonar reflecting surface;
   e) automatically directing at least a second sonar beam pulse towards a sonar reflecting surface as the device carrier moves relative to the sonar reflecting surface;
   f) automatically repeating steps d) and e) to produce a second three dimensional representation of the sonar reflecting surface; and
   g) automatically computing a bias compensation for the device.

7. The method of claim 6, further comprising;
   e) setting the bias compensation for the device; and
   f) repeating steps b)-e) until changes of bias compensation for each set of repeated steps equals the noise level of the system.

8. The method of claim 6, further comprising;
   e) automatically generating instructions to an operator of the device carrier to move the device carrier in a particular pattern.

9. The method of claim 6, further comprising;
e) automatically generating instructions instructing a controller of the device carrier to move the device carrier in a particular pattern, wherein the device carrier is an autonomous device carrier.

10. The method of claim 5, further comprising;
e) setting the bias compensation for the device; and
f) repeating steps b)-e) until changes of bias compensation for each set of repeated steps equals the noise level of the system.

11. The method of claim 5, wherein the step of automatically specifying is automatically generating instructions to an operator of the device carrier to move the device carrier in a particular pattern.

12. The method of claim 5, wherein the step of automatically specifying is automatically generating instructions instructing a controller of the device carrier to move the device carrier in a particular pattern, wherein the device carrier is an autonomous device carrier.

\* \* \* \* \*